United States Patent [19]

MacArthur et al.

[11] Patent Number: 5,194,737
[45] Date of Patent: Mar. 16, 1993

[54] SINGLE AND DOUBLE GRID LONG-RANGE ALPHA DETECTORS

[75] Inventors: Duncan W. MacArthur, Los Alamos; Krag S. Allander, Ojo Caliente, both of N. Mex.

[73] Assignee: University of California Patent, Trademark & Copyright Office, Alameda, Calif.

[21] Appl. No.: 773,002

[22] Filed: Oct. 8, 1991

[51] Int. Cl.⁵ .......................... G01T 1/18; H01J 47/02
[52] U.S. Cl. .................................... 250/382; 250/374; 250/375; 250/379
[58] Field of Search ............... 250/374, 375, 379, 380, 250/382, 384, 385.1, 388, 381; 324/459, 464

[56] References Cited

U.S. PATENT DOCUMENTS

| | | | |
|---|---|---|---|
| 2,499,830 | 3/1950 | Molloy | 250/374 X |
| 2,532,956 | 12/1950 | Simpson | 250/380 X |
| 2,599,922 | 6/1952 | Kanne | 250/380 |
| 2,979,620 | 4/1961 | Bradshaw et al. | 250/380 |
| 4,114,088 | 9/1978 | Laws | 324/464 |
| 4,238,678 | 12/1980 | Castleman et al. | 250/381 |
| 4,262,203 | 4/1981 | Overhoff | 250/374 |
| 4,837,440 | 6/1989 | Burtscher et al. | 250/379 |
| 4,977,318 | 12/1990 | Ilmasti et al. | 250/253 |
| 4,994,748 | 2/1991 | Rasulev et al. | 324/464 |
| 5,059,803 | 10/1991 | Kronenberg | 250/385.1 |

FOREIGN PATENT DOCUMENTS

| | | | |
|---|---|---|---|
| 56-100357 | 8/1981 | Japan | 324/464 |
| 57-133331 | 8/1982 | Japan | 324/464 |

Primary Examiner—Constantine Hannaher
Assistant Examiner—Edward J. Glick
Attorney, Agent, or Firm—Milton D. Wyrick

[57] ABSTRACT

Alpha particle detectors capable of detecting alpha radiation from distant sources. In one embodiment, a voltage is generated in a single electrically conductive grid while a fan draws air containing air molecules ionized by alpha particles through an air passage and across the conductive grid. The current in the conductive grid can be detected and used for measurement or alarm. Another embodiment builds on this concept and provides an additional grid so that air ions of both polarities can be detected. The detector can be used in many applications, such as for pipe or duct, tank, or soil sample monitoring.

11 Claims, 4 Drawing Sheets

SINGLE AND DOUBLE GRID LONG-RANGE ALPHA DETECTORS

The invention is a result of a contract with the Department of Energy (Contract No. W-7504-ENG-36).

BACKGROUND OF THE INVENTION

The present invention generally relates to radiation detection, and, more specifically, to the detection of alpha radiation at a relatively long distance from its point of emission using single and double grid detectors.

In any area where radioactive materials are handled, it is imperative, both for the protection of personnel and to avoid contamination of the environment, to continuously monitor personnel, equipment, and clothing to prevent the release of radioactive contamination. Alpha contaminants, such as plutonium, are particularly difficult to detect because of the limited penetration of alpha particles in air. Alpha particles from typical contaminants travel no more than one inch in air. It is because of this characteristic that prior alpha detectors have been useful only when used in close proximity to the point of possible emission. Currently, alpha contamination cannot be detected if it originates in a space that is too small for insertion of a conventional monitor. Prior detectors have normally been employed in personnel screening when moved slowly in close proximity to a person's body. Workers in nuclear processing facilities must place their hands and feet on sensors when moving from room to room. All of this can slow operations, as it is not currently possible to adequately screen personnel within a reasonable period of time.

It is also extremely difficult to monitor equipment for alpha contamination, again due to the limited range of alpha particles in air. Because of the monitoring difficulty, equipment that has been used in a potentially contaminated area is often classified as potentially contaminated and its further use is restricted to other controlled areas. If such equipment could be effectively monitored for contamination, the equipment could be released for use in uncontrolled areas. Previously, contamination inside assemblies has been impossible to detect without dismantling the assembly. The present invention allow contamination detection in any area that air can penetrate.

As used herein, the terms "long range," or "long distance," when referring to the detection capabilities of the present invention, shall mean detection from a range or distance of more than one (1) inch from the source of alpha radiation.

In the past, several instrument designs have been utilized to detect alpha radiation. Among these are GM tubes, ionization chambers, count rate detectors, and scintillation or gas flow proportional probes. While these instruments are capable of detecting alpha particles, they do so by directly detecting incident radiation, and must be within an inch of the source of the radiation. Also, these conventional alpha particle detectors can only scan an area approximately equal to the size of the detector.

The primary reason for an alpha particle's short flight path in air is its collision with air molecules. In almost all of these collisions, air ions are created which will have a longer life and area of influence than the alpha particles that created them. It is these ions that are detected by the present invention. The fact that the air ions have a longer range than the alpha particles relieves the necessity for having a detector moved over a person or equipment in order to detect the presence of alpha radiation.

In a copending application, Ser. No. 709,566, filed Jun. 3, 1991, a long range alpha detector is disclosed in which at least two grids are utilized. The present application discloses both single and double grid embodiments. In, for example, a two grid detector, one grid is the signal grid and the other is the voltage grid. As the signal grid is at virtual ground, no (or at most a very small) electric field exists between the signal grid and the grounded enclosure, and ions are not disturbed in this area. However, a significant electric field exists between the voltage grid and the signal grid. This field sweeps ions of one charge, depending on the polarity of the voltage grid, onto the signal grid, where they are detected by a current meter. Ions of the opposite polarity are swept onto the voltage grid, and their signal is lost.

With a single grid detector, according to the present invention, voltage is applied to the grid, creating an electrical field between the grid and the grounded enclosure. This sweeps ions of one polarity to the grid, while ions of the other polarity are lost to the enclosure. Using only one grid simplifies construction and reduces leakage currents because of the reduced number of grid support insulators. In a related embodiment, a combination detector combines two grids in a circuit which allow signal contribution from both polarities of ions.

It is therefore an object of the present invention to provide apparatus for the long range detection of alpha radiation using only a single grid.

It is another object of the present invention to provide apparatus for long range alpha radiation detection using two grids of opposite polarity allowing detection of alpha created ions of both polarities.

It is a further object of the present invention to provide apparatus for detection of alpha particle contamination within pipes and ducts.

It is a still further object of the present invention to provide apparatus for monitoring alpha radiation inside large tanks.

It is another object of the present invention to provide apparatus for long range monitoring of alpha radiation from soil core samples and other standard sized objects.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise an alpha particle detector that operates by detecting air ions created by collisions with alpha particles comprising an electrically conductive enclosure defining first and second openings for admitting and exhausting air and one electrically conductive grid insulatively mounted inside the enclosure. Voltage generating means create a voltage in the electrically conductive grid, and creates an electric field between the electrically conductive grid and the electrically conductive enclosure. Fan means are mounted outside the enclosure adjacent to the second opening for drawing air containing the air ions through the first opening in the enclosure and across the electric field between the electrically conductive grid and the electrically conductive enclosure. Detecting means are connected to the electrically conductive grid for indicating a current through the one electrically conductive grid produced by the air ions.

In another aspect of the current invention, and in accordance with its objects and purposes an alpha particle detector for detecting both positive and negative air ions created by collisions with alpha particles comprises an electrically conductive enclosure defining first and second openings for admitting and exhausting air with first and second electrically conductive grids insulatively mounted and spaced apart within the enclosure. Means for generating an electrical voltage has its positive terminal connected to the first electrically conductive grid and its negative terminal connected to the second electrically conductive grid, and creates an electric field in the space between said first and second electrically conductive grids. Fan means are mounted outside the enclosure adjacent to the second opening for drawing air containing the air ions through the first opening in the enclosure and into the space between the first and second electrically conductive grids. First detecting means are connected to the first electrically conductive grid for indicating a current through the first electrically conductive grid produced by the negative air ions, and second detecting means are connected to the second electrically conductive grid for indicating a current through the second electrically conductive grid produced by the positive air ions.

In a still further aspect of the present invention, and in accordance with its objects and purposes, a method of detecting a distant source of alpha particles comprises the steps of generating an electrical field between an electrically conductive grid and an electrically conductive enclosure defining first and second air passages;

drawing air containing air ions through the first air passage and across the electrically conductive grid; and detecting a current in the second electrically conductive grid produced by the air ions being attracted to the electrically conductive grid.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

The present invention involves detection of alpha radiation at a considerable distance from the point at which the radiation is being emitted. As distinguished from our copending application, the present invention can effectively monitor for alpha radiation, in one embodiment using only a single grid. This embodiment is illustrated schematically in FIG. 1.

Figure 1:
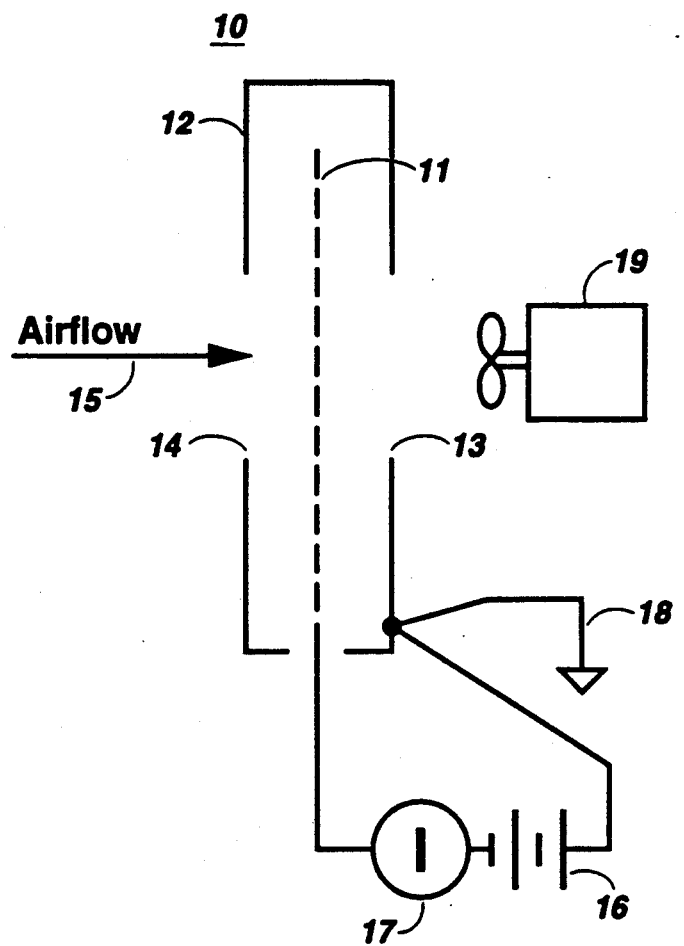
FIG. 1 is a schematic diagram of one embodiment of the single grid case of the present invention using direct current.

In FIG. 1, single grid 11 is insulatively mounted inside grounded enclosure 12, which has defined openings 13, 14 for allowing airflow 15 to flow across grid 11, drawn by fan 19. Single grid 11, in this embodiment, acts as both a signal grid and a voltage grid. Airflow 15 may contain either positive or negative air ions (not shown) created by collisions with alpha particles. Voltage source 16 is connected between grounded enclosure 12 and single grid 11 through current meter 17. Signal ground 18 is also connected to grounded enclosure 12.

As is easily understood from FIG. 1, single grid 11 has both voltage source 16 and current meter 17, which detects the additional current flow caused by the air ions, connected to it, making it at the same time a signal grid and a voltage grid. Current meter 17 may take many forms, but may conveniently be an electrometer, such as a Keithley 617 electrometer.

With voltage source 16 connected, an electric field exists between single grid 11 and grounded enclosure 12. This field sweep ions of one polarity onto single grid 11 while repelling ions of the opposite polarity. Of course, in this embodiment, a positive voltage source 16 will result in collection of negatively charged ions.

Figure 2:
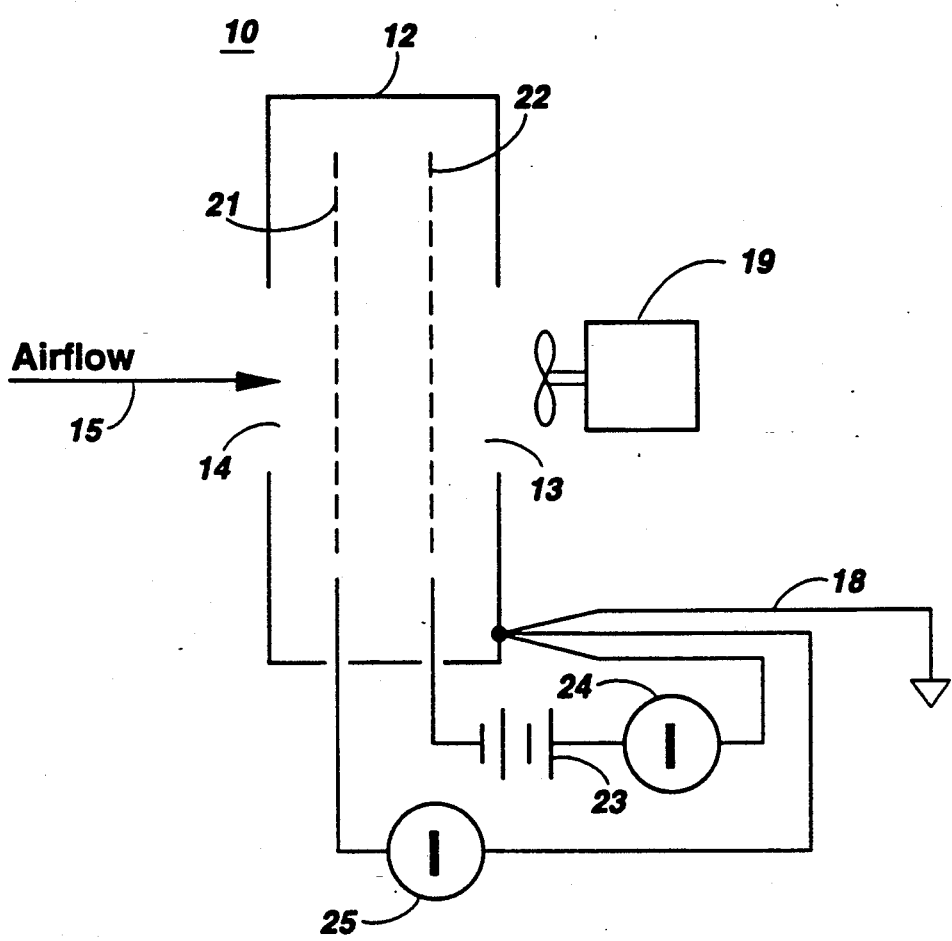
FIG. 2 is a schematic diagram of another embodiment of the present invention in which two grids are employed in order to capture both positive and negative ions.

Although the embodiment of FIG. 1 is extremely efficient in detecting alpha radiation, it could be more efficient if both polarities of ions could be collected. It is for this purpose that the embodiment illustrated in FIG. 2 is designed. In FIG. 2, two grids, signal grid 21 and voltage grid 22, are insulatively mounted inside grounded enclosure 12. Voltage source 23 is connected to voltage grid 22 and to grounded enclosure 12 through current meter 24. Current meter 25 is connected between signal grid 21 and grounded enclosure 12. Signal ground 18 is connected to grounded enclosure 12. Again, fan 19 draws airflow 15 across signal grid 21 and voltage grid 22.

In this case, assuming a positive polarity of voltage source 23 connected to voltage grid 22, positive air ions will be attracted to signal grid 21, and the positive ion current registered on current meter 25. In the same manner, negative air ions will be attracted to voltage grid 22 and the negative ion current registered on current meter 24. Electrical adding of the current on current meter 24 with the current on current meter 25 will result in a signal approximately twice as large as with the single grid embodiment. This is because, instantaneously, the probability of a negative air ion being created by collision with an alpha particle is equal to the probability that a positive ion will be created.

This two grid embodiment of the invention differs from the two grid embodiment of a long range alpha detector disclosed in copending application, Ser. No. 709,566, filed Jun. 3, 1991. In the previous application, one grid was the signal grid, and was connected to a current meter. The second grid was connected to a voltage source, but was not connected to a current meter. In the embodiment of the present application, voltage grid 22 is connected to one polarity of voltage source 23, and the other polarity is connected to enclosure 12. Additionally, current meter 24 is in the circuit with voltage source 23 in order to detect the ion current flow collected on voltage grid 22.

The level of voltages required from voltage source 16 and from voltage source 23 are not overly critical, and can be as low as 100-300 V. This low voltage is helpful in reducing electrical leakage. As in the previous embodiment, current meter 24 and current meter 25 may be electrometers.

The present invention seeks to further reduce leakage currents in order to improve sensitivity. In the embodiment of FIG. 1, single grid 11 comprises both a signal grid and a voltage grid, which means that any leakage current caused from the applied voltage will be intrinsically applied to the signal current detected by current meter 17. To minimize this leakage, the technique known a guarding from ionization chamber technology is applied as shown in FIG. 3.

Figure 3:
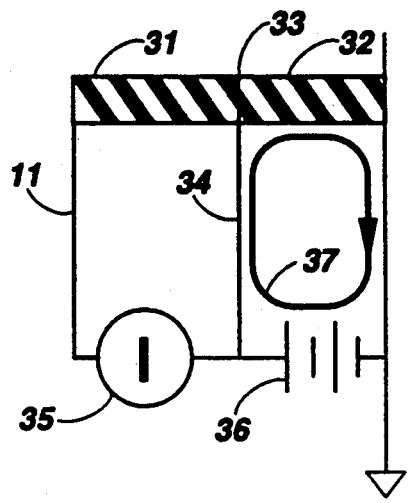
FIG. 3 is a schematic diagram of a method of reducing leakage currents in a single grid detector using guarded insulators.

In FIG. 3, a schematic representation of the embodiment of single grid 11 is shown. Here, the means for insulatively isolating single grid 11 from enclosure 12 are in two sections, insulators 31, 32. At interface 33, between insulator 31 and insulator 32, guard 34 is attached and connected between current meter 35 and voltage source 36. By this method, guard 34 is at the same potential as single grid 11, and no leakage current flows through single grid 11. Leakage current 37 flows as indicated in FIG. 3, and does not change the current measured by current meter 35.

Figure 4:
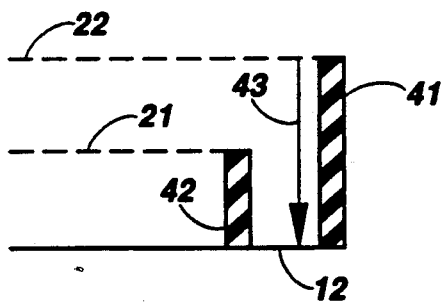
FIG. 4 is a schematic diagram of a method of reducing leakage currents in a two grid detector using separate insulators.

For the embodiment of FIG. 2, where separate signal grid 21 and voltage grid 22 are used, the leakage current solution is illustrated in FIG. 4. Here, instead of mounting both grids 21. 22 on a common insulator assembly (not shown), which would allow a leakage current to flow through grid 21, separate insulators 41, 42 are utilized. As shown, insulator 41 supports voltage grid 22, and insulator 42 supports signal grid 21. In this guarded situation, leakage current 43 flows directly from voltage grid 22 to grounded enclosure 12. It does not flow through signal grid 21.

Figure 5:
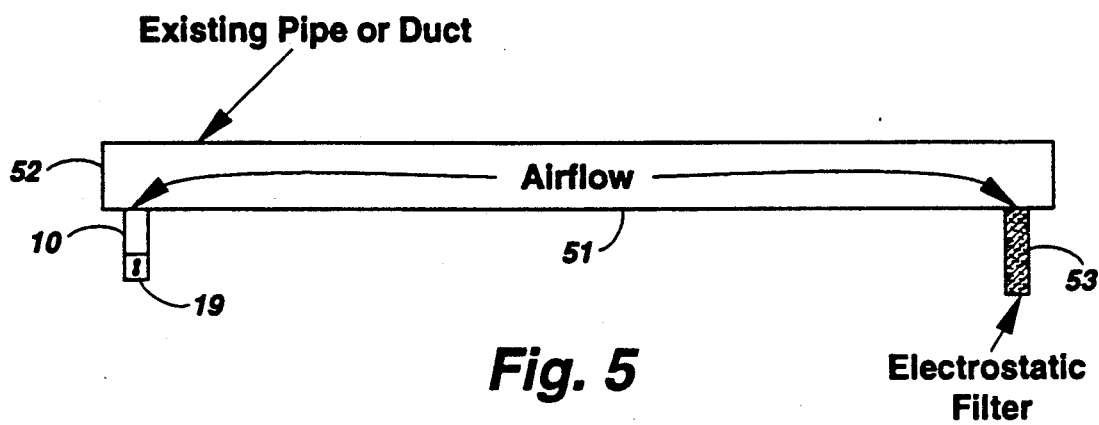
FIG. 5 is a schematic diagram of a use of the present invention as a pipe or duct monitor.
Figure 6:
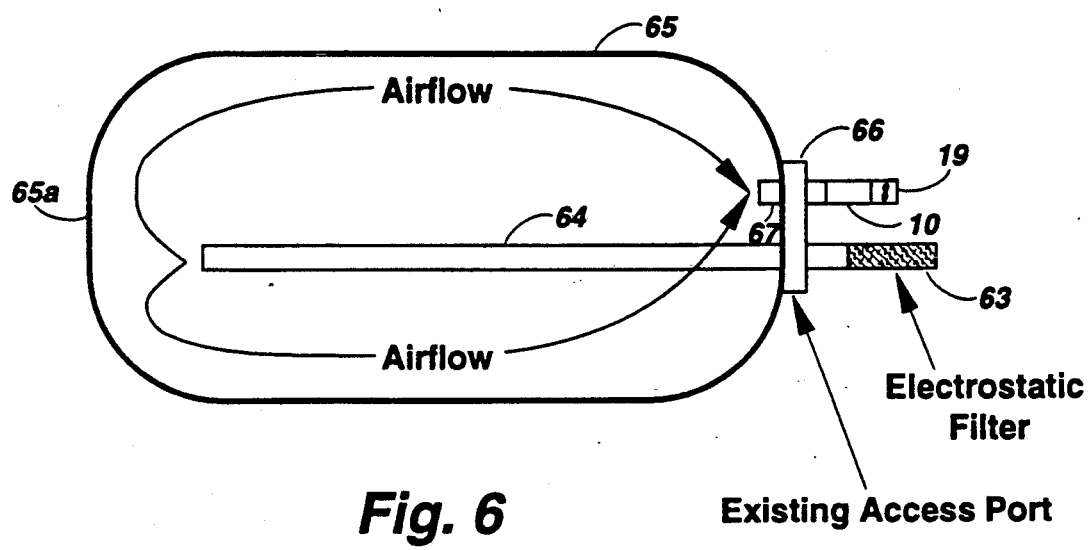
FIG. 6 is a schematic diagram of a use of the present invention as a large tank monitor.
Figure 7:
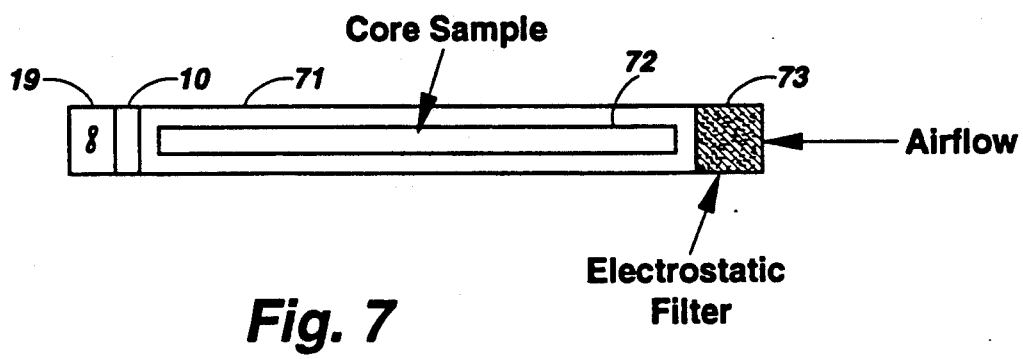
FIG. 7 is a schematic diagram of a use of the present invention as a soil sample monitor.

For possible application of detector 10, reference should be made to FIGS. 5-7. In FIG. 5, a method of monitoring the interior of a pipe or duct is illustrated in which detector 10 and fan 19 are attached to pipe or duct 51 near end 52. At the opposite end of pipe or duct 51, electrostatic filter 53 is mounted. Both detector 10 and electrostatic filter 53 can access the interior of pipe or duct 51 through an open end of pipe or duct 51, or through a gas filling or small hole (not shown). Air would be drawn by fan 19 through electrostatic filter 53, to remove any ions existing in the ambient air, through pipe or duct 51 and into detector 10. The mounting illustrated allows monitoring the interior of pipe or duct 51 without physical intrusion.

In nuclear production facilities, both operating and decommissioned, monitoring of inaccessible locations is a major problem. The pipe or duct monitoring method of FIG. 5 allows monitoring for alpha radiation inside sections of pipe or duct in operating plants, or taken from decommissioned facilities, without physical removal of the pipes or ducts.

In FIG. 6, a method of monitoring large tanks which have a single access port is illustrated, in which air inlet tube 64, having an electrostatic filter 63 on its outer end, is inserted through access port 66 into tank 65 almost to bottom 65a. Exhaust tube 67 is also inserted inside tank 65 through access port 66, and has detector 10 and fan 19 attached to its exterior end. In operation, ambient air is drawn by fan 19 through electrostatic filter 63 and is transported toward bottom 65a through tube 64. The air, and any ions created by alpha radiation, are then drawn around the inner surfaces of tank 65 and into detector 10.

As with pipes and ducts, nuclear facilities have large tanks which are presently being inadequately monitored. This method allows alpha monitoring inside such tanks without removing the tank from its location, or physically destroying it. Although different air inlet tubes 64 and exhaust tube 67 would be required for different sizes of tank 65, the tubing is inexpensive and easily obtained. The monitor of the present invention is a simple and direct solution to tank monitoring.

It is often necessary for soil core samples to be chemically analyzed to determine exact soil contaminants. However, prior to shipment for such analysis, a surface radioactivity check is required in order to satisfy shipping regulations. A method of simply accomplishing this check is shown in FIG. 7. Here, enclosure 71 is shaped to closely fit the size of soil sample 72. At one end of enclosure 71, fan 19 and detector 10 are mounted. Electrostatic filter 73 is removably mounted to the other end, being removable to allow insertion of sample 72. A vertical orientation of enclosure 71 might facilitate support of sample 72, As before, fan 19 draws air through electrostatic filter 73, across sample 72 and into detector 10. This technique can be used to quickly evaluate soil samples 72 for alpha contamination prior to a more thorough analysis.

The methods illustrated in FIG. 5-7 are quite applicable to present and future environmental cleanup and restoration. They also exhibit the great versatility of the present invention in solving radiation monitoring problems which are intractable with conventional monitoring methods.

The foregoing description of the embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An alpha particle, detector that operates by detecting air ions created by collisions with alpha particles emitted from a distant alpha particle source comprising:
   an electrically conductive enclosure defining first and second openings for admitting and exhausting air;
   one electrically conductive grid insulatively mounted inside said enclosure;
   means for generating a voltage in said one electrically conductive grid, creating an electric field between said one electrically conductive grid and said electrically conductive enclosure;
   fan means mounted outside said enclosure adjacent to said second opening for drawing air containing said air ions through said first opening in said enclosure and across said electric field between said one electrically conductive grid and said electrically conductive enclosure; and detecting means connected to said one electrically conductive grid for indicating a current through said one electrically conductive grid produced by said air ions.

2. The alpha particle detector as described in claim 1, wherein said one electrically conductive grid comprises a planar electrically conductive grid.

3. The alpha particle detector as described in claim 2, wherein said planar electrically conductive grid is insulatively mounted by an insulator having two interfacing sections, with a guard conductor attached at said interface and to said means for generating a voltage, wherein said planar electrically conductive grid and said guard conductor are at equal voltages.

4. The alpha particle detector as described in claim 1, wherein said detecting means comprises an electrometer.

5. The alpha particle detector as described in claim 1, wherein said means for generating a voltage generates a voltage of at least 100 V in said electrically conductive grid.

6. The alpha particle detector as described in claim 1, wherein said detector is mounted at one end of a pipe or duct, with an electrostatic filter mounted at the opposite end for admitting ion free ambient air, said detector monitoring for alpha radiation within said pipe or duct.

7. The alpha particle detector as described in claim 1, wherein said detector is mounted at one end of a first tube inserted through an access port of a large tank having proximal and distal ends, and an electrostatic filter is mounted at one end of a second tube which extends through said access port substantially to said distal end of said tank for admitting ion free ambient air, said detector monitoring for alpha radiation within said tank.

8. The alpha particle detector as described in claim 1, wherein said detector is mounted at one open end of an elongated enclosure, with an electrostatic filter removably mounted at the opposite open end of said enclosure for admitting ion free ambient air, said detector monitoring for alpha radiation from soil core samples placed into said enclosure.

9. An alpha particle detector for detecting both positive and negative air ions created by collisions with alpha particles emitted from a distant alpha particle source comprising:

an electrically conductive enclosure defining first and second openings for admitting and exhausting air;

first and second electrically conductive grids insulatively mounted and spaced apart within said enclosure;

means for generating an electrical voltage, said electrical voltage having its positive terminal connected to said first electrically conductive grid and its negative terminal connected to said electrically conductive enclosure and to said second electrically conductive grid, creating an electric field in said space between said first and second electrically conductive grids as well as between said first and second electrically conductive grids and said electrically conductive enclosure;

fan means mounted outside said enclosure adjacent to said second opening for drawing air containing said air ions through said first opening in said enclosure and into said space between said first and second electrically conductive grids;

first detecting means connected to said first electrically conductive grid for indicating a current through said first electrically conductive grid produced by said negative air ions; and second detecting means connected to said second electrically conductive grid for indicating a current through said second electrically conductive grid produced by said positive air ions.

10. The alpha particle detector as described in claim 9, wherein said first and second electrically conductive grids are each mounted within said enclosure on separate guarded insulators.

11. A method of detecting a distant source of alpha particles comprising the steps of:

generating an electrical field between an electrically conductive grid and an electrically conductive enclosure defining first and second air passages;

drawing air containing air ions created by collisions with alpha particles emitted from said distant source through said first air passage and across said electrically conductive grid; and detecting a current in said second electrically conductive grid produced by said air ions being attracted to said electrically conductive grid.

* * * * *